US00RE34493E

United States Patent [19]

Lutz

[11] E Patent Number: Re. 34,493

[45] Reissued Date of Patent: Jan. 4, 1994

[54] APPARATUS FOR LOADING AND UNLOADING OBJECTS

[76] Inventor: David W. Lutz, P.O. Box 810, Carlisle, Pa. 17013

[21] Appl. No.: 734,488

[22] Filed: Jul. 23, 1991

Related U.S. Patent Documents

Reissue of:

[64] Patent No.: 5,020,382
Issued: Jun. 4, 1991
Appl. No.: 481,432
Filed: Feb. 20, 1990

[51] Int. Cl.[5] ..... B60K 1/04

[52] U.S. Cl. ..... 74/89.2

[58] Field of Search ..... 74/89.12, 89, 89.21, 74/89.22, 89.2; 414/71, 267, 266, 227, 331, 561, 608, 278, 279, 589

[56] References Cited

U.S. PATENT DOCUMENTS

| | | | |
|---|---|---|---|
| 3,047,095 | 7/1962 | Bell et al. | 74/89.21 X |
| 3,074,563 | 1/1963 | Montgomery | 74/89.21 X |
| 3,447,697 | 6/1969 | Morey et al. | 214/8.5 |
| 4,143,780 | 3/1979 | Schnell | 414/620 |
| 4,265,582 | 5/1981 | Theobald | 414/281 |
| 4,450,400 | 5/1984 | Gwyn | 320/2 |
| 4,568,233 | 2/1986 | Baker et al. | 414/267 |
| 4,749,327 | 6/1988 | Roda | 74/89.2 X |

FOREIGN PATENT DOCUMENTS

| | | |
|---|---|---|
| 3027993 | 2/1982 | Fed. Rep. of Germany . |
| 2478597 | 9/1981 | France . |

*Primary Examiner*—Richard E. Moore

[57] ABSTRACT

Apparatus for loading and unloading objects including a first carriage; apparatus for moving the first carriage back and forth in a straight line in a first plane between a first position and second position; a second carriage; and apparatus for moving the second carriage back and forth between the first position and the second position such that, when the first carriage is in the first position, the second carriage is in the second position and, as the first carriage moves to the second position, the second carriage moves out of the first plane, then back into the first plane and into the first position.

60 Claims, 4 Drawing Sheets

APPARATUS FOR LOADING AND UNLOADING OBJECTS

Matter enclosed in heavy brackets [ ] appears in the original patent but forms no part of this reissue specification; matter printed in italics indicates the additions made by reissue.

FIELD OF THE INVENTION

This invention relates to apparatus for loading and unloading objects such as palletized loads. In particular, it relates to such apparatus in which a plurality of carriages alternate between two positions, such as a loading/unloading station on an assembly line and a position having access to the lift of a truck.

BACKGROUND OF THE INVENTION

Palletized loads are often loaded and unloaded using a plurality of carriages that alternate between two positions on a continuous looped track, which may be either in a horizontal plane (like a racetrack) or in a vertical plane (like a ferris wheel). While both these lay outs are relatively simple mechanically, then consume a relatively large amount of floor space. Accordingly, a need has been apparent for apparatus for alternating a plurality of carriages between two positions that would consume less floor space, even at the cost of some increase in the complexity of the mechanisms involved.

OBJECT OF THE INVENTION

It is the principal object of this invention to provide apparatus for alternating a plurality of carriages between two positions which consumes relatively little floor space.

It is another object of the invention to provide such apparatus which is as sturdy as possible, which employs hardware that is not prone to mechanical failure, and which requires relatively little maintenance.

It is still another object of the invention to provide such apparatus which requires less operator time to operate than do prior art devices.

SUMMARY OF THE INVENTION

With the foregoing in mind, the apparatus for loading and unloading objects according to the invention includes a first carriage; first means for moving the first carriage back and forth in a straight line in a first plane between a first position and a second position; a second carriage; and second means for moving the second carriage back and forth between the first position and the second position such that, when the first carriage is in the first position, the second carriage is in the second position and, as the first carriage moves to the second position, the second carriage moves out of the first plane, then back into the first plane and into the first position.

DETAILED DESCRIPTION OF THE PRESENTLY PREFERRED EMBODIMENT

Figure 1:
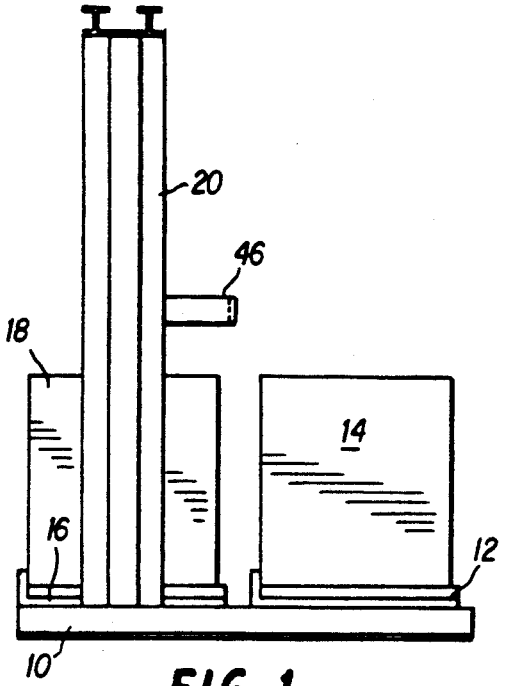
FIG. 1 is a schematic side view of the invention showing the first carriage in its first position and the second carriage in its first position.
Figure 2:
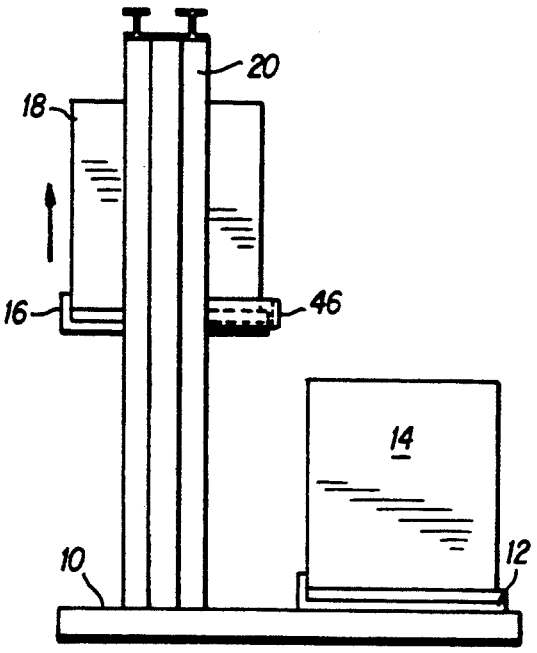
FIG. 2 is a schematic side view of the invention showing the first carriage in its first position and the second carriage in its second position.
Figure 3:
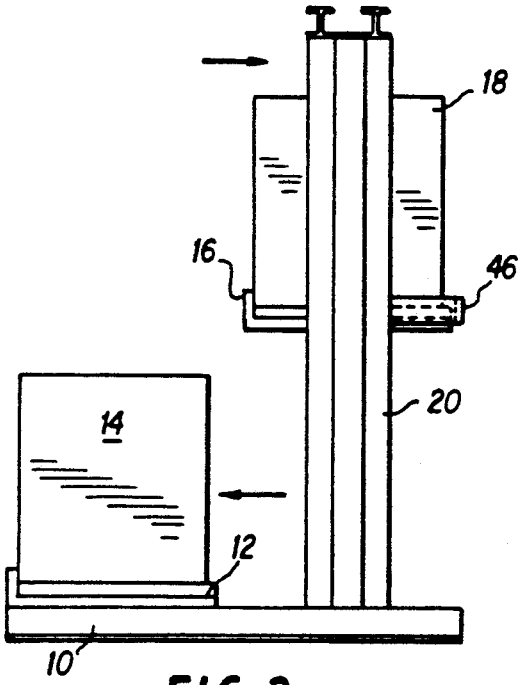
FIG. 3 is a schematic side view of the invention showing the first carriage in its second position and the second carriage in its third position.
Figure 4:
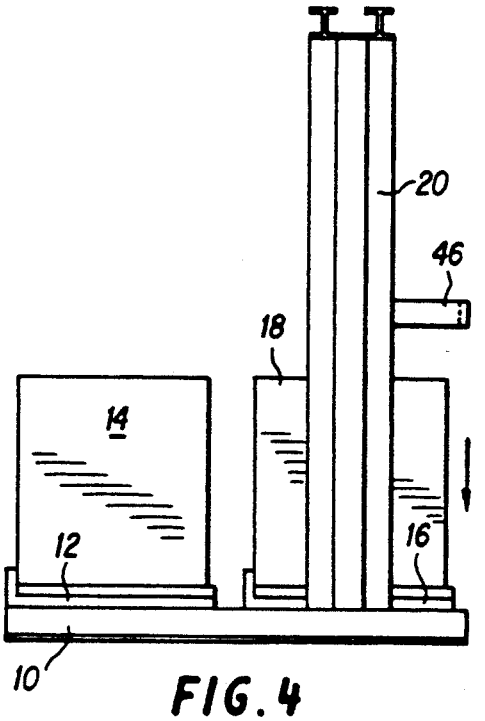
FIG. 4 is a schematic side view of the invention showing the first carriage in its second position and the second carriage in its fourth position.

FIGS. 1–4 illustrate the mode of operation of the invention in schematic form. As illustrated in those drawings, the invention comprises a base 10 (which may be fabricated as a part of the assembly including the other components of the invention or which may be part of another facility on which the other components of the invention are mounted), a first carriage 12 (shown carrying a first palletized load 14), a second carriage 16 (shown carrying a second palletized load 18), and a gantry 20. In use, the first carriage 12 is moved back and forth between a first position (shown in FIGS. 1 and 2) and a second position (shown in FIGS. 3 and 4); the second carriage 16 is moved from a first position (shown in FIG. 1) which is identical to the second position of the first carriage 12 to a second position (shown in FIG. 2), from the second position to a third position (shown in FIG. 3), from the third position to a fourth position (shown in FIG. 4) which is identical to the first position of the first carriage 12, and vice-versa; and the gantry 20 is moved back and forth between a first position (shown in FIGS. 1 and 2) and a second position (shown in FIGS. 3 and 4).

A sequence of movements (which could be either a loading or an unloading sequence) will now be described. In the first stage of the sequence (shown in FIG. 1), a the first carriage 12 is on the right at ground level, and the second carriage 16 is on the left at ground level. In the second stage of the sequence (shown in FIG. 2), the first carriage 12 remains on the right at ground level, and the second carriage 16 is moved vertically relative to the gantry 20 to an elevated position while remaining on the left. In the third stage of the sequence (shown in FIG. 3), the first carriage 12 is moved from the right to the left while remaining at ground level, and the second carriage 16 is moved from the left to the right while remaining in an elevated position. In the fourth stage of the sequence (shown in FIG. 4), the first carriage 12 remains on the left at ground level, and the second carriage 16 is moved vertically relative to the gantry 20 back to ground level while remaining on the right. Thus, the first carriage 12 and the second carriage 16 have exchanged positions.

To reverse the positions of the first carriage 12 and the second carriage 16, the sequence of motions is reversed. That is, the first carriage 12 remains at ground level and moves back to its first position, and the second carriage 16 is moved from its lower right position to its upper right position, from its upper right position to its upper left position, and from its upper left position to its lower left position.

It is important to bear in mind throughout the description that the first and second carriages 12 and 16 ar distinct and that each carriage follows a different path. The first carriage 12 does not move vertically, and the second carriage 16 does not move in a single linear path.

Figure 6:
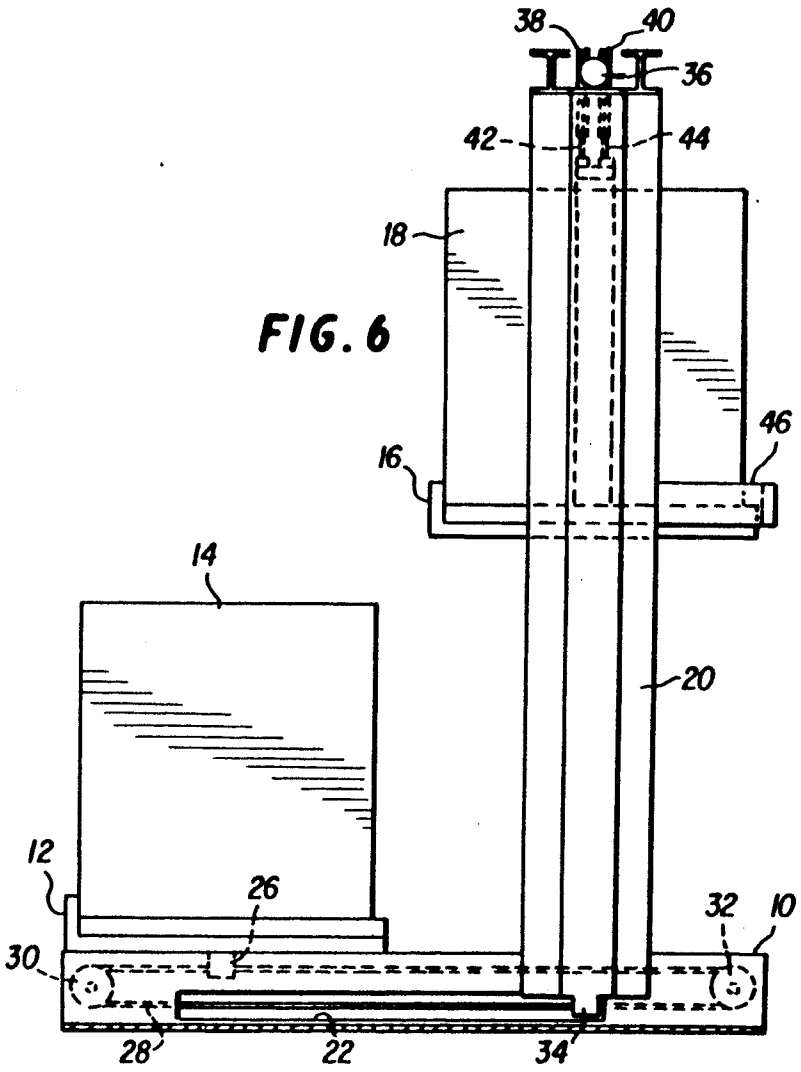
FIG. 6 is a side view of the invention showing the first carriage in its second position, the second carriage in its third position, the gantry in its second position, the apparatus for moving the first carriage back and forth between its first and second positions, the apparatus for moving the gantry back and forth between its first and second positions, and the apparatus for moving the second carriage up and down relative to the gantry.
Figure 5:
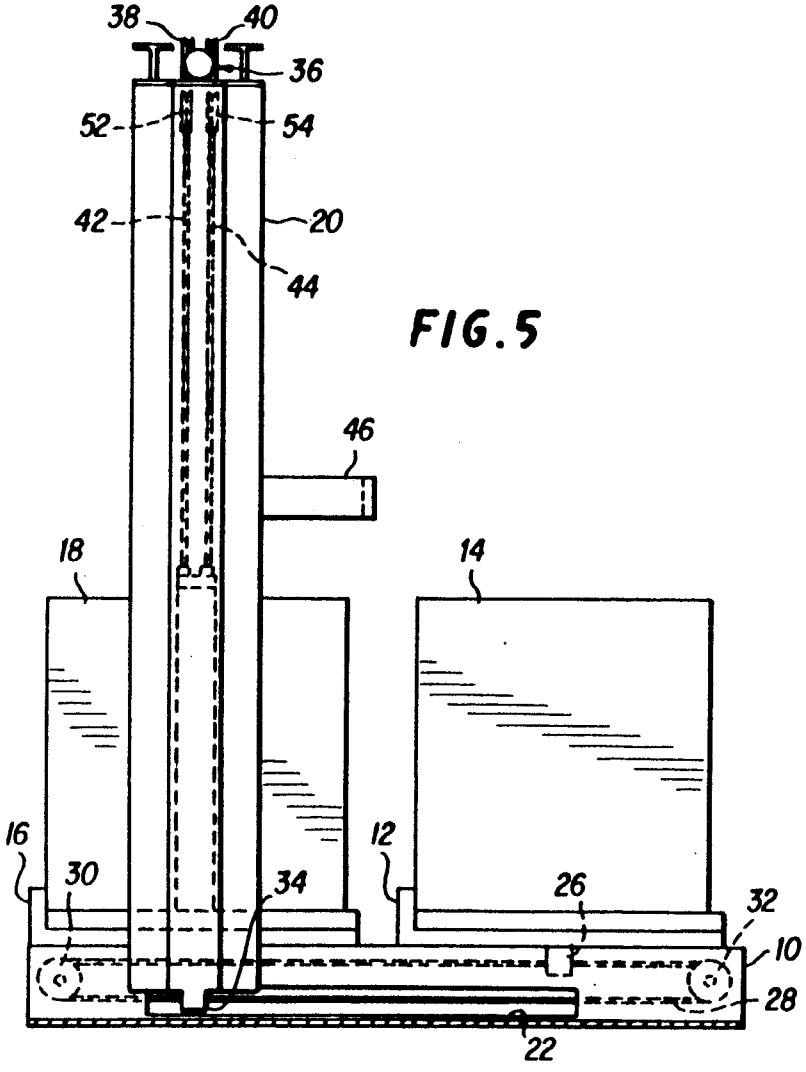
FIG. 5 is a side view of the invention showing the first carriage in its first position, the second carriage in its first position, the gantry in its first position, the apparatus for moving the first carriage back and forth between its first and second positions, the apparatus for moving the gantry back and forth between its first and second positions, and the apparatus for moving the second carriage up and down relative to the gantry.

Turning to FIGS. 5 and 6, some of the presently preferred apparatus for accomplishing the foregoing results will be seen. The prime mover for the horizontal motion of both the first carriage 12 and the gantry 20 is a fluid cylinder 22 mounted o the base 10. While any convenient type of fluid cylinder (or, indeed, other types of prime movers) could be used, I prefer to use a cable cylinder incorporating a cable 24 (best seen in FIG. 9). As will be explained subsequently with reference to FIG. 9, the fluid cylinder 22 effects reciprocation of the first carriage 12. The first carriage 12 is in turn attached via a dog 26 on each transverse side to the top run of a cable 28. Each cable 28 is trained over a sheave 30 mounted at the left end of the base 10 (in FIGS. 5 and 6) and a sheave 32 mounted at the right end of the base 10. The gantry 20 is attached via a dog 34 on each transverse side to the bottom run of each cable 28. Thus, when the fluid cylinder 22 is actuated in one direction, the first carriage 12 will move to the left while the gantry 20 moves to the right, and when the fluid cylinder 22 is actuated in the other direction, the first carriage 12 will move to the right while the gantry 20 moves to the left.

The prime mover for the vertical motion of the second carriage 16 is preferably a fluid cylinder 36 mounted on the gantry 20. (Of course, other types of prime movers could be substituted for the fluid cylinder 36.) Details of the fluid cylinder 36 are explained subsequently with reference to FIGS. 7 and 8. However, in FIGS. 5 and 6 it will be seen that two sheaves 38, 40 are preferably mounted on the fluid cylinder 36, that a cable 42 is trained over the sheave 38, that a cable 44 is trained over the sheave 40, and that one end of each of the cables 42, 44 is attached to the second carriage 16. Thus, when the fluid cylinder 36 is extended, the second carriage 16 is moved from its lower position to its upper position, and when the fluid cylinder 36 is retracted, the second carriage 16 is moved from its upper position to its lower position.

Before leaving FIGS. 5 and 6, note that a reinforcement bracket 46 is mounted on the gantry 20. It is preferably U shaped, and it receives the second carriage 16 when it is in its upper position. The purpose of the reinforcement bracket 46 is to reinforce the gantry 20.

Figure 8:
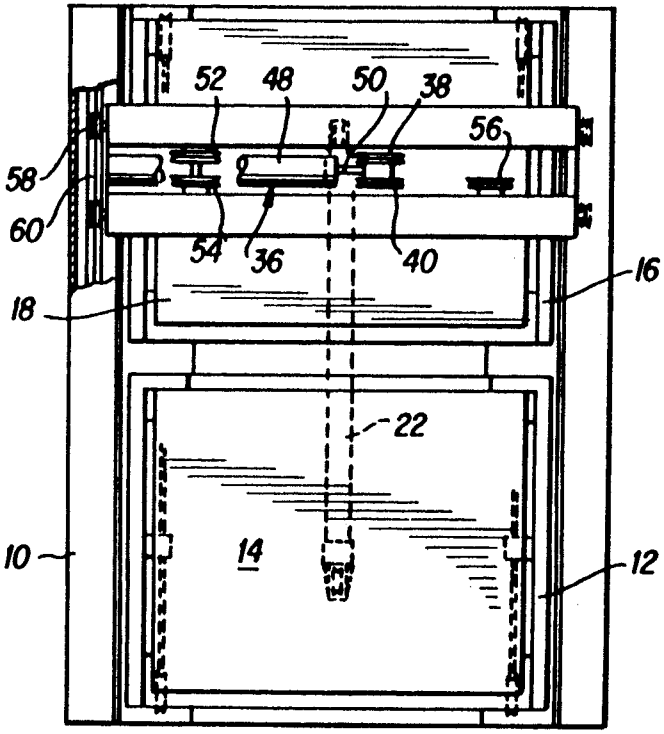
FIG. 8 is a top view showing the apparatus for moving the second carriage up and down relative to the gantry, the apparatus for moving the first carriage back and forth between its first and second positions, and the apparatus for moving the gantry back and forth between its first and second positions.
Figure 7:
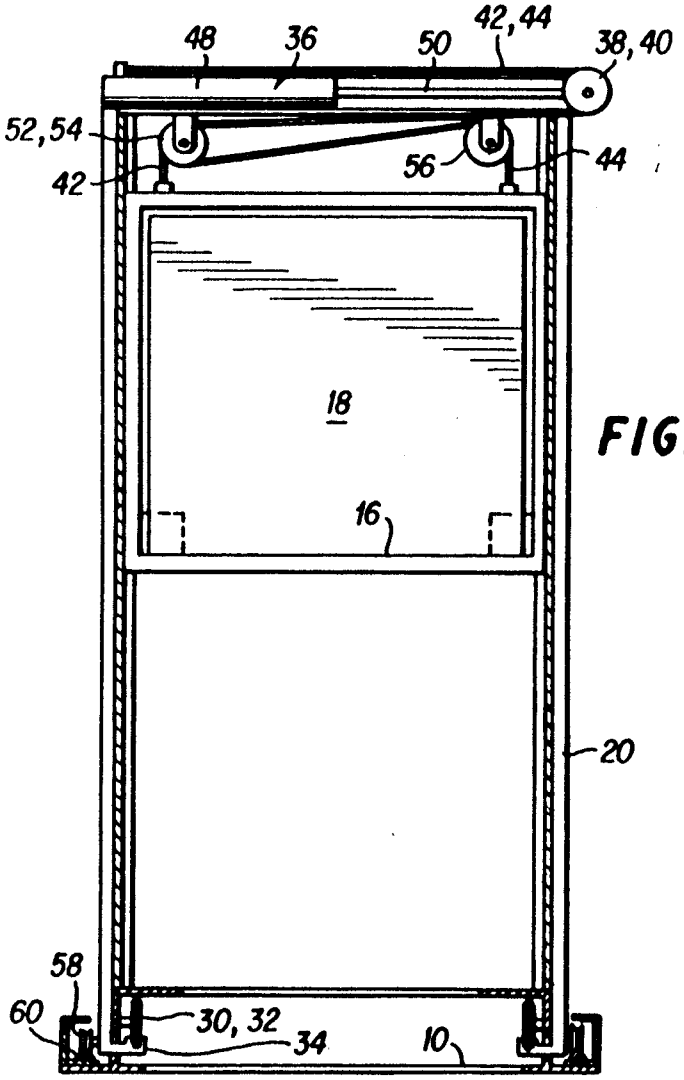
FIG. 7 is a partly cross sectional end view showing the second carriage in an upper position (i.e., either its second position or its third position), two of the wheels on which the gantry moves, and the apparatus for moving the second carriage up and down relative to the gantry.

Turning to FIGS. 7 and 8, more of the apparatus for moving the gantry 20 horizontally and the apparatus for moving the second carriage 16 vertically relative to the gantry 20 will be seen. While the second carriage 16 could certainly be raised and lowered using a single cable, I prefer to use the two cables 42, 44 in order to achieve a well balanced vertical motion with a minimum of slide guides between the second carriage 16 and the gantry 20. Thus, as shown in FIG. 7, I use the fluid cylinder 36 comprising a cylinder 48 and a piston rod 50, I mount the sheaves 38, 40 on the piston rod 50, and I attach one end of each of the cables 42, 44 to the cylinder 48 or to the gantry 20. The cables 42, 44 are trained around the sheaves 38, 40 and sheaves 52, 54 mounted on the left side of the gantry 20 (in FIG. 7). The active end of the cable 42 is attached to the second carriage 16 beneath the sheaves 52, 54. The active end of the cable 44 is trained around a sheave 56 and attached to the second carriage 16 beneath the sheave 56. Thus, the vertical motion of the second carriage 16 is approximately twice the horizontal motion of the piston rod 50.

Before leaving FIGS. 7 and 8, note that the gantry 20 is mounted on a plurality of wheels 58 that roll on a track 60 on each transverse side of the base 10.

Figure 9:
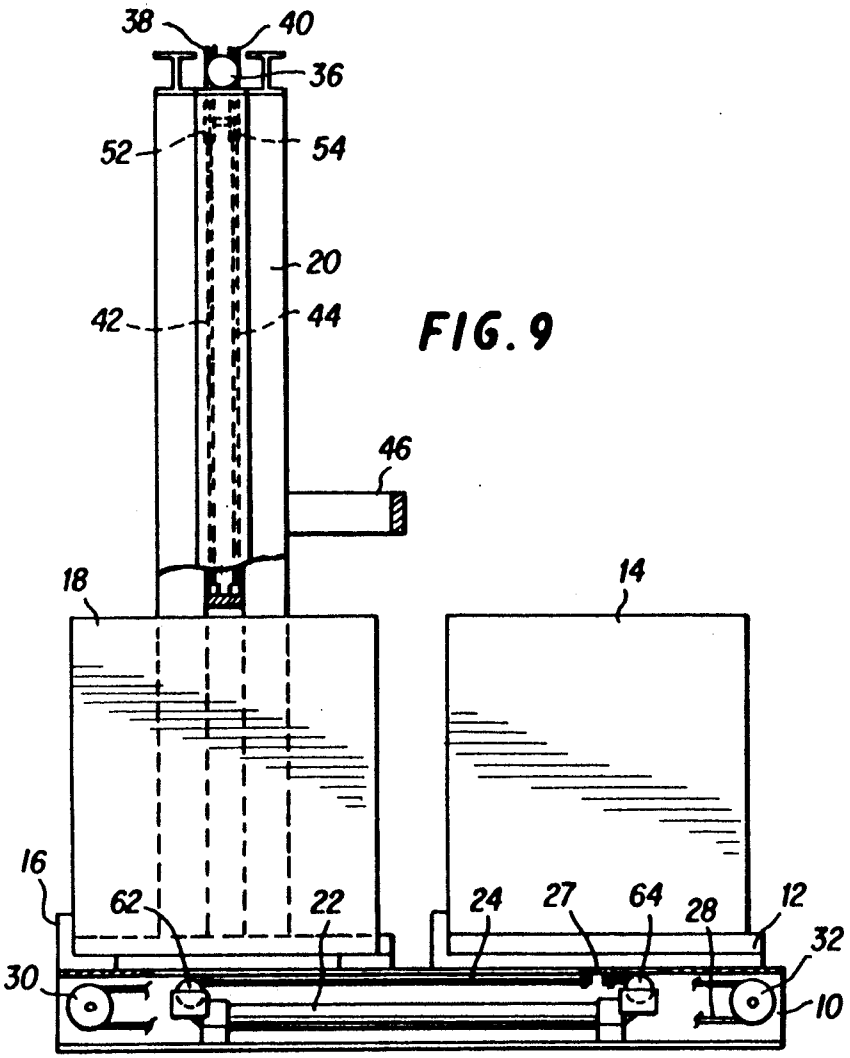
FIG. 9 is a side view showing the first carriage in its first position, the second carriage in its first position, and the apparatus for moving the first carriage back and forth between its and first and second positions.

Turning to FIG. 9, not the fluid cylinder 22 that drives the cable 24. The cable 24 is trained over a sheave 62 mounted at the left end of the first carriage 12 (in FIG. 9) and a sheave 64 mounted at the right end of the first carriage 12. The first carriage 12 is attached to the top run of the cable 24 via a dog 27. Also note the sheaves 30 and 32 (one of each on each transverse side of the base 10) and the cables 28 trained over the sheaves 30, 32. (The dogs 34 have been omitted from FIG. 9.)

The first carriage 12 is mounted on a plurality of wheels 66 that roll on a track 68 on each transverse side of the base 10.

Figure 10:
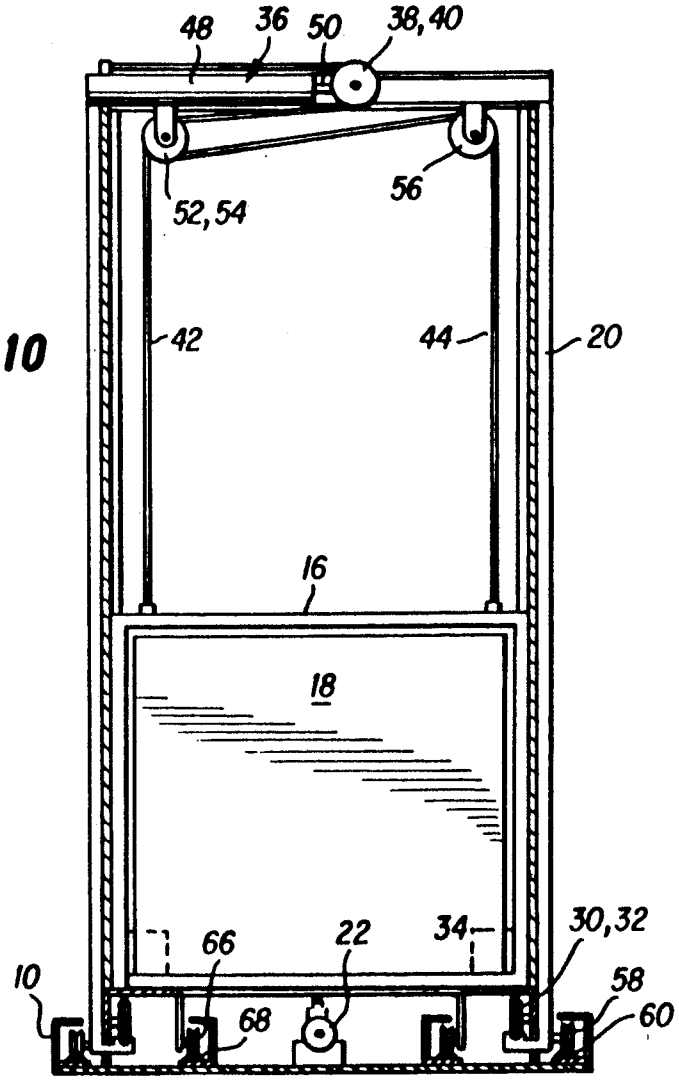
FIG. 10 is a partly cross sectional end view showing the second carriage in a lower position (i.e., either its first position or its fourth position), and the apparatus for moving the second carriage up and down relative to the gantry.

FIG. 10 is like FIG. 7 except that it shows the second carriage 16 in its down position and that it shows the fluid cylinder 22.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. Apparatus for loading and unloading objects, said apparatus comprising:

(a) a first carriage;

(b) first means for moving said first carriage back and forth in a straight line in a first plane between a first position and a second position, said first means comprising:

(i) a first chain having a first run that is parallel to or in said first plane;

(ii) third means for attaching said first carriage to said first run of said first chain; and (iii) fourth means for moving said first run of said first chain back and forth;

(c) a second carriage; and (d) second means for moving said second carriage back and forth between said first position and said second position such that, when said first carriage is in said first position, said second carriage is in said second position and, as said first carriage moves to said second position, said second carriage moves out of said first plane, then back into said first plane and into said first position, said second means comprising:

(i) a gantry;

(ii) a second chain having a first run that is parallel to or in said first plane;

(iii) fifth means for attaching said gantry to said first run of said second chain; and (iv) sixth means for moving said second carriage up and down relative to said gantry, said sixth means comprising a third chain a first end of which is attached to said second carriage.

2. Apparatus as recited in claim 1 wherein:

(a) said first plane is a horizontal plane and (b) during its movement from said first position to said second position and vice-versa, said second carriage moves vertically out of said first plane, then moves horizontally in a second horizontal plane, and then moves vertically back into said first plane.

3. Apparatus as recited in claim 1 wherein said fourth means comprises a first fluid cylinder.

4. Apparatus as recited in claim 1 wherein said gantry and said first carriage move simultaneously.

5. Apparatus as recited in claim 1 wherein a second end of said third chain is fixed relative to said gantry.

6. Apparatus for loading and unloading objects, said apparatus comprising:

(a) a first carriage;

(b) first means for moving said first carriage back and forth in a straight line in a first plant between a first position and a second position, said first means comprising:

(i) a first chain having a first run that is parallel to or in said first plane;

(ii) third means for attaching said first carriage to said first run of said first chain; and (iii) fourth means for moving said first run of said first chain back and forth;

(c) a second carriage; and (d) second means for moving said second carriage back and forth between said first position and said second position such that, when said first carriage is in said first position, said second carriage is in said second position and, as said first carriage moves to said second position, said second carriage moves out of said first plane, then back into said first plane and into said first position, said second means comprising:

(i) a gantry;

(ii) a second chain having a first run that is parallel to or in said first plane;

(iii) fifth means for attaching said gantry to said first run of said second chain; and (iv) sixth means for moving said second carriage up and down relative to said gantry, said sixth means comprising:

(A) a second fluid cylinder comprising a cylinder mounted on said gantry and a piston;

(B) a first sheave mounted on said piston; and (C) a third chain trained over said first sheave and having a first end attached to said second carriage and a second end attached to said cylinder or to said gantry.

7. Apparatus as recited in claim 6 wherein said sixth means further comprise:

(a) a second sheave mounted on said piston and (b) a fourth chain trained over said second sheave and having a first end attached to said second carriage and a second end attached to said cylinder or to said gantry.

8. Apparatus for loading and unloading objects, said apparatus comprising:

(a) a first carriage;

(b) first means for moving said first carriage back and forth in a straight line in a first plane between a first position and a second position;

(c) a second carriage; and (d) second means for moving said second carriage back and forth between said first position and said second position such that, when said first carriage is in said first position, said second carriage is in said second position and, as said first carriage moves to said second position, said second carriage moves out of said first plane, then back into said first plane and into said first position, said second means comprising:

(i) a gantry;

(ii) a second chain having a first run that is parallel to or in said first plane;

(iii) seventh means for attaching said gantry to said first run of said second chain; and (iv) eight means for moving said second carriage relative t said gantry, said eighth means comprising:

(A) a second fluid cylinder comprising a cylinder mounted on said gantry and a piston;

(B) a first sheave mounted on said piston; and (C) a third chain trained over said first sheave and having a first end attached to said second carriage and a second end attached to said cylinder or to said gantry.

9. Apparatus as recited in claim 8 wherein said gantry and said first carriage move simultaneously.

10. Apparatus as recited in claim 8 wherein a second end of said second chain is fixed relative to said gantry.

11. Apparatus as recited in claim 8 wherein said eighth means further comprises:

(a) a second sheave mounted on said piston and (b) a fourth chain trained over said second sheave and having a first end attached to said second carriage and a second end attached to said cylinder or to said gantry.

12. Apparatus as recited in claim 1 wherein:

(a) said sixth means further comprise:

(i) a second fluid cylinder comprising a cylinder mounted on said gantry and a piston and (ii) a first sheave mounted on said piston and (b) said third chain is trained over said first sheave and has a first end attached to said second carriage and a second end attached to said cylinder or to said gantry.

13. Apparatus as recited in claim 12 wherein said sixth means further comprise:

(a) a second sheave mounted on said piston and (b) a fourth chain trained over said second sheave and having a first end attached to said second carriage and a second end attached to said cylinder or to said gantry.

14. Apparatus as recited in claim 6 wherein:
(a) said first plane is a horizontal plane and
(b) during its movement from said first position to said second position and vice versa, said second carriage moves vertically out of said first plane, then moves horizontally in a second horizontal plane, and then moves vertically back into said first plane.

15. Apparatus as recited in claim 6 wherein said fourth means comprises a first fluid cylinder.

16. Apparatus as recited in claim 6 wherein said gantry and said first carriage move simultaneously.

17. Apparatus as recited in claim 6 wherein a second end of said third chain is fixed relative to said gantry.

18. Apparatus as recited in claim 8 wherein:
(a) said first plane is a horizontal plane and
(b) during its movement from said first position to said second position and vice versa, said second carriage moves vertically out of said first plane, then moves horizontally in a second horizontal plane, and then moves vertically back into said first plane.

19. Apparatus as recited in claim 8 wherein said first means comprise:
(a) a first chain having a first run that is parallel to or in said first plane;
(b) third means for attaching said first carriage to said first run of said first chain; and
(c) fourth means for moving said first run of said first chain back and forth.

20. Apparatus as recited in claim 19 wherein said fourth means comprises a first fluid cylinder.

21. Apparatus for loading and unloading objects, said apparatus comprising:
(a) a base;
(b) a gantry mounted on said base and projecting upwardly therefrom;
(c) a first carriage mounted on said base;
(d) first means for moving said first carriage back and forth in a straight line on said base between a first position and a second position;
(e) a second carriage mounted on said gantry and positionable in either said first position or said second position;
(f) second means for moving said second carriage up and down relative to said gantry;
(g) third means for moving said gantry back and forth in a straight line on said base; and
(h) fourth means for interrelating said first means and said second and third means such that, when said first carriage is in said first position, said second carriage is in said second position and, as said first carriage moves from said first position to said second position, said second carriage moves upwardly on said gantry from said second position, then said gantry moves relative to said base, and then said second carriage moves downwardly on said gantry and into said first position.

22. Apparatus as recited in claim 21 wherein said first means comprises:
(a) a first chain having a first run that is parallel to said first base;
(b) fourth means for attaching said first carriage to said first run of said first chain; and
(c) fifth means for moving said first run of said first chain back and forth.

23. Apparatus as recited in claim 22 wherein said fifth means comprises a first fluid cylinder.

24. Apparatus as recited in claim 22 wherein said third means comprise:
(a) a second chain having a first run that is parallel to said base and
(b) sixth means for attaching said gantry to said first run of said second chain.

25. Apparatus as recited in claim 24 wherein said gantry and said first carriage moves simultaneously.

26. Apparatus as recited in claim 24 wherein said second means comprises a third chain a first end of which is attached to said second carriage.

27. Apparatus as recited in claim 26 wherein a second end of said third chain is fixed relative to said gantry.

28. Apparatus as recited in claim 24 wherein said second means comprise:
(a) a second fluid cylinder comprising a cylinder mounted on said gantry and a piston;
(b) a first sheave mounted on said piston; and
(c) a third chain trained over said first sheave and having a first end attached to said second carriage and a second end attached to said cylinder or to said gantry.

29. Apparatus as recited in claim 28 wherein said second means further comprise:
(a) a second sheave mounted on said piston and
(b) a fourth chain trained over said second sheave and having a first end attached to said second carriage and a second end attached to said cylinder or to said gantry.

30. Apparatus as recited in claim 21 wherein said third means comprises:
(a) a second chain having a first run that is parallel to said base and
(b) seventh means for attaching said gantry to said first run of said second chain.

31. Apparatus as recited in claim 30 wherein said gantry and said first carriage moves simultaneously.

32. Apparatus as recited in claim 30 wherein said second means comprises a third chain a first end of which is attached to second carriage.

33. Apparatus as recited in claim 32 wherein a second end of said second chain is fixed relative to said gantry.

34. Apparatus as recited in claim 30 wherein said second means comprises:
(a) a second fluid cylinder comprising a cylinder mounted on said gantry and a piston;
(b) a first sheave mounted on said piston; and
(c) a third chain trained over said first sheave and having a first end attached to said second carriage and a second end attached to said cylinder or to said gantry.

35. Apparatus as recited in claim 34 wherein said second means further comprises:
(a) a second sheave mounted on said piston and
(b) a fourth chain trained over said second sheave and having a first end attached to said second carriage and a second end attached to said cylinder or to said gantry.

*36. Apparatus for loading and unloading objects, said apparatus comprising:*
*(a) a first carriage;*
*(b) first means for moving said first carriage back and forth in a straight line in a first plane between a first position and a second position;*

(c) a second carriage; and (d) second means for moving said second carriage back and forth between a first position and a second position such that:

(i) said first position of said second carriage is at least substantially identical to said second position of said first carriage and said second position of said second carriage is spaced vertically from said first position of said first carriage and (ii) when said first carriage is in its first position, said second carriage is in its second position and, as said first carriage moves to its second position, said second carriage moves out of said first plane and to its second position.

37. Apparatus as recited in claim 36 wherein said first means comprise:

(a) a first chain having a first run that is parallel to or in said first plane;

(b) third means for attaching said firth carriage to said first run of said first chain; and (c) fourth means for moving said first run of said first chain back and forth.

38. Apparatus as recited in claim 37 wherein said fourth means comprise a first fluid cylinder.

39. Apparatus as recited in claim 36 wherein said second means comprise:

(a) a gantry;

(b) a second chain having a first run that is parallel to or in said first plane;

(c) fifth means for attaching said gantry to said first run of said second chain; and (d) sixth means for moving said second carriage up and down relative to said gantry.

40. Apparatus as recited in claim 39 wherein said sixth means comprise a third chain a first end of which is attached to said second carriage.

41. Apparatus as recited in claim 39 wherein said gantry and said first carriage move simultaneously.

42. Apparatus as recited in claim 40 wherein a second end of said third chain is fixed relative to said gantry.

43. Apparatus as recited in claim 39 wherein said sixth means comprise:

(a) a second fluid cylinder comprising a cylinder mounted on said gantry and a piston;

(b) a first sheave mounted on said piston; and (c) a third chain trained over said first sheave and having a first end attached to said second carriage and a second end attached to said cylinder or to said gantry.

44. Apparatus as recited in claim 43 wherein said sixth means further comprise:

(a) a second sheave mounted on said piston and (b) a fourth chain trained over said second sheave and having a first end attached to said second carriage and a second end attached to said cylinder or to said gantry.

45. Apparatus as recited in claim 36 wherein:

(a) said first plane is a horizontal plane and (b) during its movement from its first position to its second position, said second carriage moves vertically out of said first plane, then moves horizontally in a second horizontal plane.

46. Apparatus as recited in claim 36 wherein said second position of said second carriage is spaced vertically above said first position of said first carriage.

47. Apparatus for loading and unloading objects, aid apparatus comprising:

(a) a base;

(b) a gantry mounted on said base and projecting upwardly therefrom;

(c) a first carriage mounted on said base;

(d) first means for moving said first carriage back and forth in a straight line on said base between a first position and a second position;

(e) a second carriage mounted on said gantry and positionable in either:

(i) a first position that is at least substantially identical to said second position of said first carriage and (ii) a second position that is spaced vertically from said first position of said first carriage;

(f) second means for moving said second carriage up and down relative to said gantry;

(g) third means for moving said gantry back and forth in a straight line on said base; and (h) fourth means for interrelating said first means and said second and third means such that:

(i) when said first carriage is in its first position, aid second carriage is in its first position;

(ii) as said first carriage moves from its first position to its second position, said second carriage moves from its first position to its second position; and (iii) as said first carriage moves from its second position to its first position, said second carriage moves from its second position to its first position.

48. Apparatus as recited in claim 47 wherein said first means comprise:

(a) a first chain having a first run that is parallel to said base;

(b) fifth means for attaching said first carriage to said first run of said first chain; and (c) sixth means for moving said first run of said first chain back and forth.

49. Apparatus as recited in claim 48 wherein said fifth means comprise a first fluid cylinder.

50. Apparatus as recited in claim 47 wherein said third means comprise:

(a) a second chain having a first run that is parallel to said base and (b) seventh means for attaching said gantry to said first run of said second chain.

51. Apparatus as recited in claim 50 wherein said gantry and said first carriage move simultaneously.

52. Apparatus as recited in claim 47 wherein said second means comprise a third chain a first end of which is attached to said second carriage.

53. Apparatus as recited in claim 52 wherein a second end of said third chain is fixed relative to said gantry.

54. Apparatus as recited in claim 47 wherein said second means comprise:

(a) a second fluid cylinder comprising a cylinder mounted on said gantry and a piston;

(b) a first sheave mounted on said piston; and (c) a third chain trained over said first sheave and having a first end attached to said second carriage and a second end attached to said cylinder or to said gantry.

55. Apparatus as recited in claim 54 wherein said second means further comprise:

(a) a second sheave mounted on said piston and (b) a fourth chain trained over said second sheave and having a first end attached to said second carriage and a second end attached to said cylinder or to said gantry.

56. Apparatus as recited in claim 47 wherein said third means comprise:

(a) a second chain having a first run that is parallel to said base and

*(b) eighth means for attaching said gantry to said first run of said second chain.*

*57. Apparatus for loading and unloading objects, said apparatus comprising:*

*(a) a first carriage;*

*(b) first means for moving said first carriage back and forth in a straight line in a first plane between a first position and a second position;*

*(c) a second carriage; and*

*(d) second means for moving said second carriage back and forth between a first position and a second position such that:*

*(i) said first position of said second carriage is at least substantially identical to said second position of said first carriage and said second position of said second carriage is at least substantially identical to said first position of said first carriage and*

*(ii) when said first carriage is in its first position, said second carriage is in its second position and, as said first carriage moves to its second position, said first second carriage moves out of said first plane and to its second position.*

*58. Apparatus as recited in claim 57 wherein said first means comprise:*

*(a) a first chain having a first run that is parallel to or in said first plane;*

*(b) third means for attaching said first carriage to said first run of said first chain; and*

*(c) fourth means for moving said first run of said first chain back and forth.*

*59. Apparatus as recited in claim 58 wherein said fourth means comprise a first fluid cylinder.*

*60. Apparatus as recited in claim 57 wherein:*

*(a) said first plane is a horizontal plane and*

*(b) during its movement from its first position to its second position, said second carriage moves vertically out of said first plane, then moves horizontally in a second horizontal plane.*

* * * * *